United States Patent [19]

Delle Donne et al.

[11] 4,058,682
[45] Nov. 15, 1977

[54] EXPANDABLE MEMORY FOR PCM SIGNAL TRANSMISSION

[75] Inventors: Roberto Delle Donne; Luigi Musumeci, both of Milan, Italy

[73] Assignee: Societa Italiana Telecommunicazioni Siemens S.p.A., Milan, Italy

[21] Appl. No.: 692,732

[22] Filed: June 4, 1976

[30] Foreign Application Priority Data

June 5, 1975 Italy .................................. 24019/75

[51] Int. Cl.$^2$ ............................................. H04J 3/06
[52] U.S. Cl. ............................................. 179/15 AF
[58] Field of Search ...................... 179/15 AF, 15 BS; 178/69.5 R

[56] References Cited

U.S. PATENT DOCUMENTS

| 3,725,591 | 4/1973 | Palombari | 179/15 AF |
| 3,920,918 | 11/1975 | Thomas | 179/15 AF |
| 3,928,727 | 12/1975 | Roche | 179/15 AF |

Primary Examiner—David L. Stewart
Attorney, Agent, or Firm—Karl F. Ross

[57] ABSTRACT

An incoming bit stream of a first bit frequency, divided into a succession of $n$-bit words, is converted into an outgoing bit stream of a second bit frequency with the aid of two $n$-stage buffer registers alternately loaded by two sets of interleaved writing pulses, on every $n^{th}$ cycle of the first bit frequency, with incoming words which are alternately read out on every $n^{th}$ cycle of the second bit frequency by two sets of interleaved reading pulses. A logic network detects the coincidence of a reading pulse from one set with either of two guard pulses immediately preceding and succeeding, respectively, each writing pulse of the corresponding set; upon such coincidence, a switching network transposes the two sets of writing pulses to restore an original relative pulse position in which the reading pulses of each set occur substantially midway between writing pulses of the same set.

7 Claims, 4 Drawing Figures

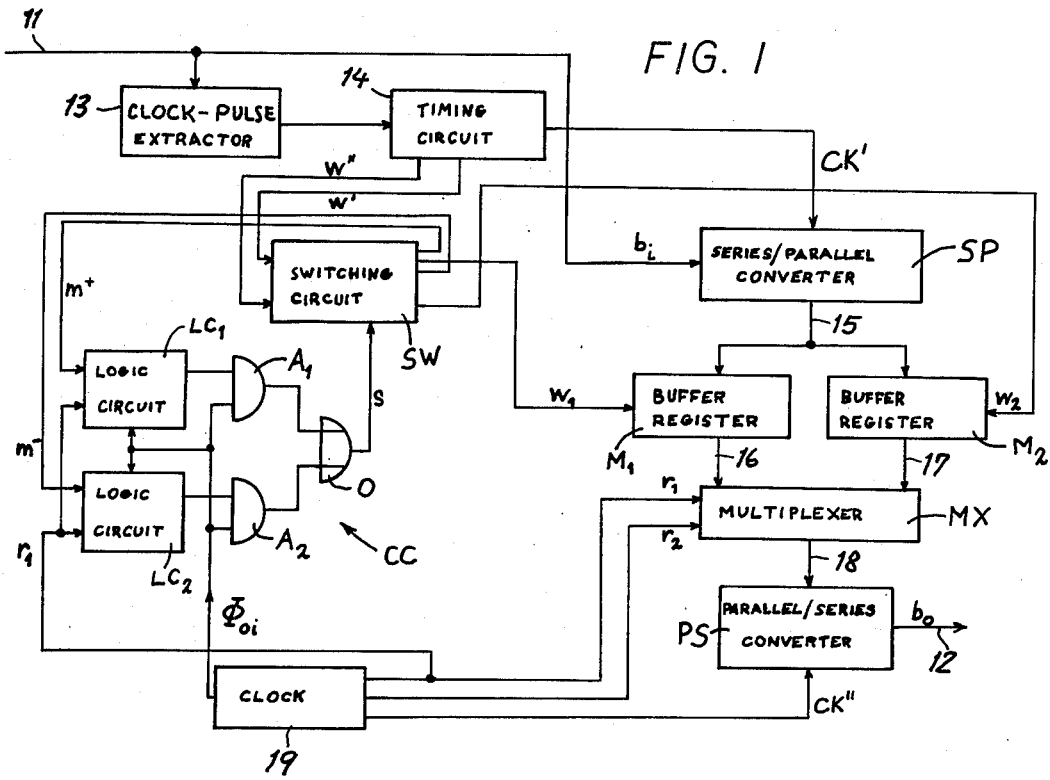
FIG. 1
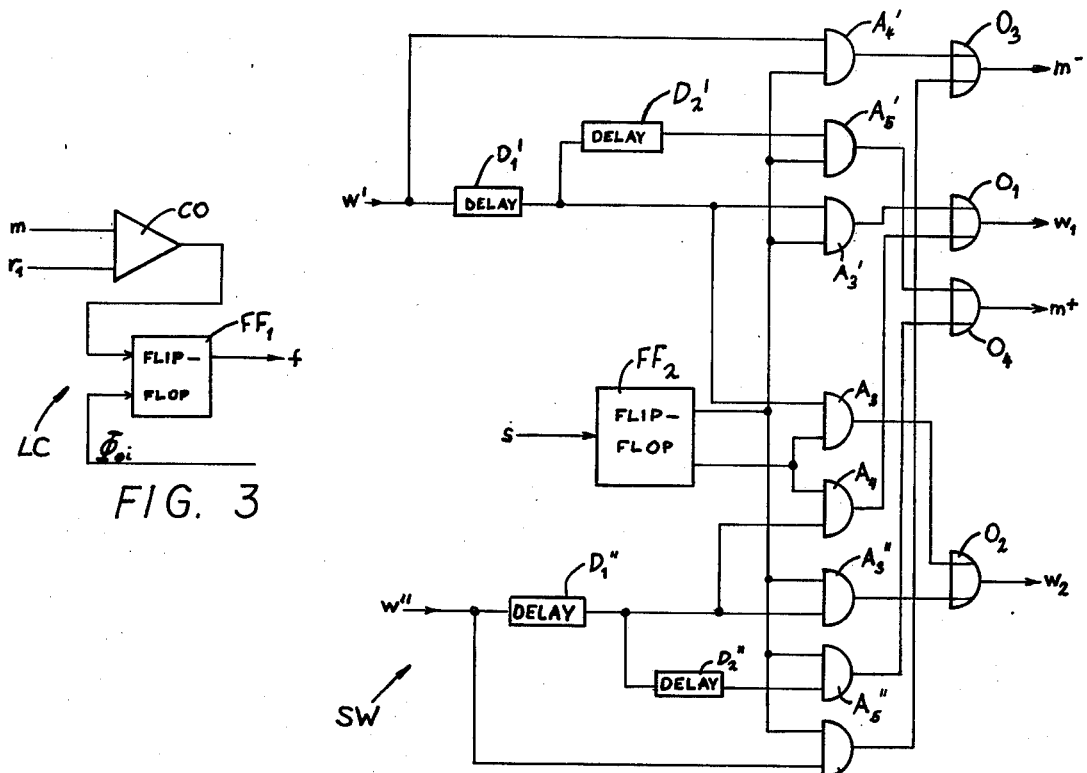
FIG. 3
FIG. 4

EXPANDABLE MEMORY FOR PCM SIGNAL TRANSMISSION

FIELD OF THE INVENTION

Our present invention relates to an expandable memory of the type used in pulse-code-modulation (PCM) signal transmission for the purpose of letting an incoming bit stream, of a first bit frequency or cadence, be retransmitted in the form of an outgoing bit stream of a second bit frequency or cadence differing slightly from the first one.

BACKGROUND OF THE INVENTION

In commonly owned U.S. Patent application Ser. No. 684,012, filed May 7, 1976 by Francesco Fenoglio, there has been disclosed an expandable memory to be used at a junction of several incoming lines carrying respective bit streams of the same cadence, the bits of each incoming stream being organized in a recurrent lower-order frame; these frames are then interleaved, bit by bit, in a composite outgoing stream to form a recurrent higher-order frame to be transmitted over a PCM link to a remote terminal where the bits are redistributed into replicas of the original bit streams. The expandable memory described and claimed in that copending application operates by introducing so-called stuffing bits into the higher-order frame, some of the stuffing bits being replaced from time to time by message bits in order to maintain the necessary correlation between the incoming and outgoing bit streams.

OBJECT OF THE INVENTION

The object of our present invention is to provide a simplified expandable memory, operating without stuffing bits, to serve as an interface unit for converting an incoming bit stream of a first bit frequency, divided into a succession of $n$-bit words, into an outgoing bit stream of a second bit frequency, also divided into $n$-bit words, with or without interleaving of several contributing bit streams to form the incoming stream as described in the aforementioned Fenoglio application.

SUMMARY OF THE INVENTION

We realize this object by providing first timing means controlled by the incoming bit stream for generating a first pair of interleaved pulse trains of a cadence $\frac{1}{2}n$ times the first bit frequency and second timing means independent of the first bit stream for generating a second pair of interleaved pulse trains of a cadence $\frac{1}{2}n$ times the second bit frequency, the pulses of each train of the second pair being normally spaced from the pulses of corresponding trains of the first pair. The words of the incoming bit stream are alternately written, via first circuit means controlled by the first pair of pulse trains (referred to hereinafter as writing-pulse trains), in two $n$-stage buffer registers from which they are alternately read out via second circuit means under the control of the second pair of pulse trains (referred to hereinafter as reading-pulse trains). With the aid of monitoring means connected to the first and second circuit means, near-coincidences of a pulse from one of the reading-pulse trains with a pulse of the corresponding writing-pulse train result in a switchover between the pulse trains of one of these pairs, i.e., a transposition thereof to re-establish a normal spacing between the associated reading and writing pulses.

In order to facilitate the detection of such near-coincidences, we prefer to provide one of the aforementioned timing means with outputs producing a first and a second guard pulse immediately before and immediately after each pulse of one of the trains of the respective pair, more specifically the pulses of one of the two writing-pulse trains in conformity with the preferred embodiment described hereinafter. A logic network, constituting the aforementioned monitoring means, generates a transposition command for the switching circuit in response to a coincidence of either of these guard pulses with a pulse of the corresponding train of the other pair, i.e., one of the reading-pulse trains in accordance with this specific embodiment. The logic network may include storage means for temporarily preserving the transposition command until the arrival of a periodic test pulse which, advantageously, recurs once per outgoing frame in a predetermined time position of that frame and whose frequency is thus a submultiple of the cadence of the reading-pulse trains.

BRIEF DESCRIPTION OF THE DRAWING

The above and other features of our invention will now be described in detail with reference to the accompanying drawing in which:

FIG. 1 is a block diagram of an expandable memory according to our invention;

FIG. 3 is a more detailed diagram of a logic circuit included in the expandable memory; and FIG. 4 shows details of a switching circuit also forming part of that memory.

SPECIFIC DESCRIPTION

Figure 2:
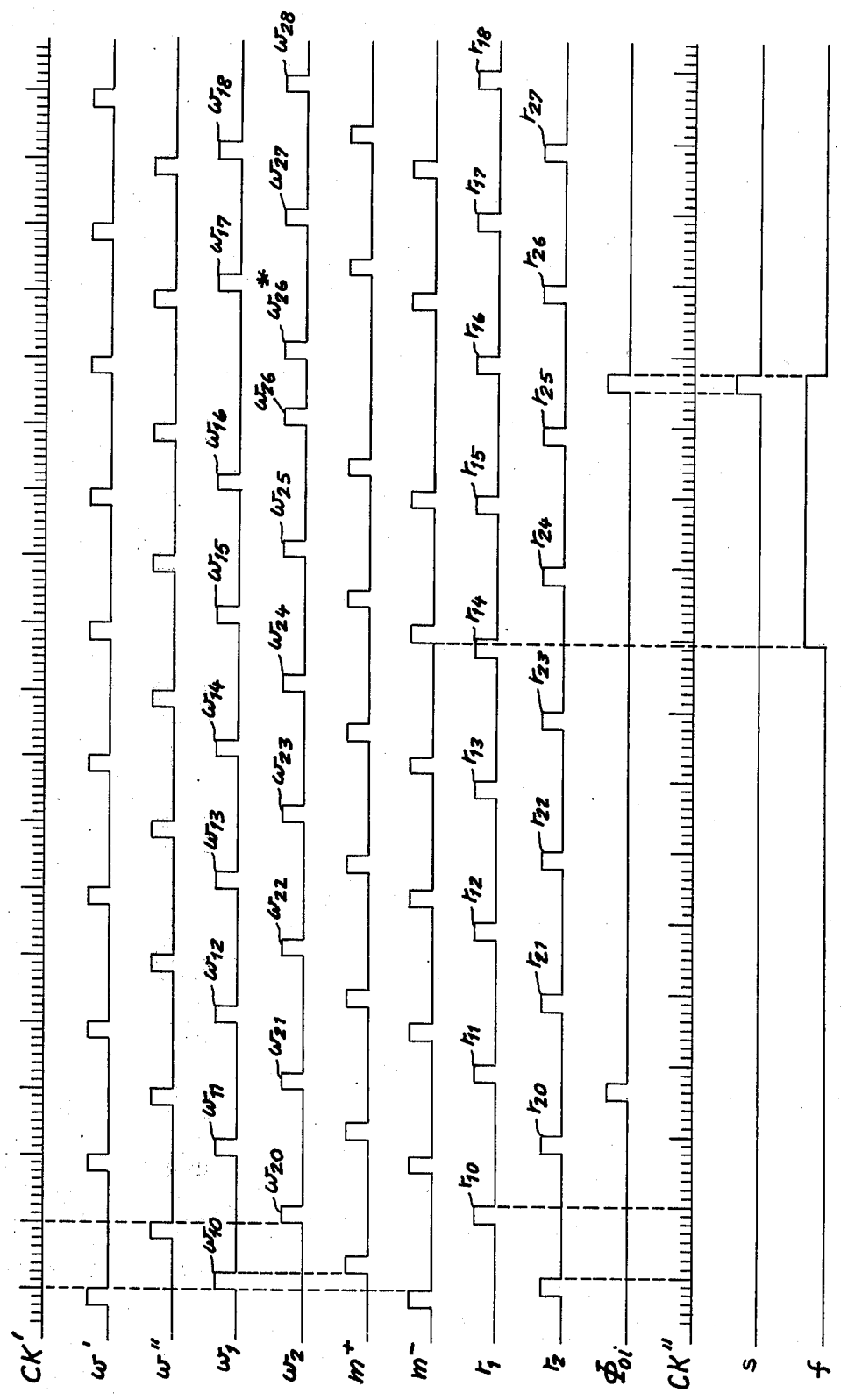
FIG. 2 is a set of graphs relating to the operation of the system of FIG. 1.

In FIG. 1 we have shown an expandable memory according to our invention receiving an incoming bit stream $b_i$ over a line 11 and emitting an outgoing bit stream $b_o$ over a line 12. Line 11 may originate at a multiplexer which interleaves a plurality of contributing bit streams, in the manner described in the aforementioned Fenoglio application Ser. No. 684,012, to produce the stream $b_i$. A clock-pulse extractor 13, connected to line 11, detects the cadence of the incoming bits in a manner known per se and operates a timing circuit 14 including a frequency divider which emits a sequence of clock pulses CK' and two interleaved primary pulse trains $w'$, $w''$ as illustrated in the three top graphs of FIG. 2. It will be noted from these graphs that a pulse $w'$ or $w''$ recurs on every 16th clock pulse CK', corresponding to as many bits in incoming stream $b_i$; with bit stream $b_i$ consisting of 8-bit words ($n = 8$), pulses $w'$ and $w''$ occur at the beginning of alternate words.

The two primary pulse trains $w'$ and $w''$ are fed to a switching circuit SW emitting two trains of writing pulses $w_1$ and $w_2$ as well as two sets of guard pulses $m+$ and $m-$ all of the same cadence as the primary pulses, i.e. recurring at 1/16 the frequency of clock pulses CK'. As indicated by the corresponding graphs in FIG. 2, each writing pulse $w_1$ is immediately preceded by a leading guard pulse $m-$ and immediately followed by a trailing guard pulse $m+$; in this specific instance, for reasons that will be apparent from the subsequent discussion of FIG. 4, the leading guard pulses $m-$ coincide with the primary pulses $w'$ (or $w''$). A writing pulse $w_1$ or $w_2$ is thus generated just after the last clock pulse CK' of an 8-pulse series accompanying the arrival of an 8-bit word over line 11.

Bit stream $b_i$ enters a series/parallel converter SP which is controlled by the clock pulses CK' from timer 14 to distribute the incoming bits to an 8-bit multiple 15 with parallel branches extending to a pair of buffer registers $M_1$ and $M_2$. Each of these registers $M_1$, $M_2$ is enabled by a respective writing pulse $w_1$, $w_2$ to receive the eight immediately preceding bits, simultaneously present at that instant on multiple 15, which constitute the word last arrived over line 11. Thus, these incoming words are alternately written into registers $M_1$ and $M_2$. Two further 8-lead multiples 16 and 17 extend from these registers to a multiplexer MX feeding, via a similar multiple 18, a parallel/series converter PS whose output lead is the line 12. Registers $M_1$ and $M_2$ along with multiplexer MX constitute a bit-storing network with a pair of writing inputs and a pair of reading inputs.

Multiplexer MX is controlled by two interleaved trains of reading pulses $r_1$ and $r_2$ generated by a local clock circuit 19 which also delivers a train of clock pulses CK'' to converter PS. From the corresponding graphs of FIG. 2 it will be seen that the locally generated clock pulses CK'', determining the bit frequency of the outgoing stream $b_o$, have a slightly lower cadence than the clock pulses CK' derived via circuits 13, 14 from the incoming bit stream $b_i$; the recurrence frequency of the interleaved reading pulses $r_1$ and $r_2$ is related to the cadence of clock pulses CK'' by the same ratio of 1:2n (i.e. 1:16) as exists between the writing pulses $w_1$, $w_2$ and the clock pulses CK'. Evidently, the discrepancy between the incoming-bit and outgoing-bit rates requires the occasional suppression of incoming bits in order to maintain the necessary correlation between the two bit streams.

At the beginning of the operating period here considered, the writing pulses $w_1$, $w_2$ are in a quadrature relationship with the corresponding reading pulses $r_1$, $r_2$. After a number of cycles depending upon the divergence of the two bit rates, these two pairs of pulse trains will have relatively shifted to such an extent that pulses $r_1$ and $r_2$ nearly coincide with pulses $w_1$ and $w_2$, respectively. If the relative shifting of the pulse trains were allowed to proceed beyond that point, the writing of new words into the registers $M_1$ and $M_2$ at the time of readout would result in a distortion of the incoming information. Thus, in accordance with our present invention, an actual coincidence of reading and writing pulses associated with a common buffer register is prevented by the provision of a monitoring unit CC receiving the guard pulses $m-$ and $m+$ from switching circuit SW as well as one set of reading pulses, here the train $r_1$, from clock circuit 19. Unit CC comprises two logic circuits $LC_1$ and $LC_2$, more fully illustrated at LC in FIG. 3, each having one input receiving the reading pulses $r_1$ and another input receiving guard pulses $m+$ and $m-$, respectively. A test pulse $\Phi_{oi}$, occurring once per outgoing frame, is delivered by clock circuit 19 to the two logic circuits $LC_1$ and $LC_2$. This test pulse $\Phi_{oi}$ advantageously comes into existence in a time slot of an initial subdivision of a frame assigned to the transmission of supervisory signals rather than to messages from a specific PCM channel.

As shown in FIG. 3, where $m$ represents either of the two types of guard pulses $m+$ and $m-$, each logic circuit LC comprises a comparator CO receiving the pulses $m$ and $r_1$ on its two inputs and working into the setting input of a flip-flop $FF_1$ whose resetting input is periodically energized by the test pulse $\Phi_{oi}$. A signal $f$, shown in the bottom graph of FIG. 2, appears in the set output of flip-flop $FF_1$ whenever the comparator CO detects a coincidence between pulses $m$ and $r_1$; the signal disappears on the trailing edge of the next test pulse $\Phi_{oi}$. The leading edge of this test pulse opens a pair of AND gates $A_1$ and $A_2$, FIG. 1, also receiving the output signals of logic circuits $LC_1$ and $LC_2$, respectively; these AND gates work into an OR gate O whose output is a switchover command $s$ for circuit SW. In response to that switchover command, circuit SW transposes the two writing-pulse trains $w_1$ and $w_2$ with reference to the primary pulse trains $w'$ and $w''$, thereby restoring the previous quadrature relationship with reading-pulse trains $r_1$ and $r_2$ which are not affected by the switchover.

As will be apparent hereinafter, only one of the logic circuits $LC_1$, $LC_2$ will emit an output signal $f$ as long as the phase relationship between the reading and writing pulses varies monotonically, i.e., while the difference between the two bit cadences is of constant sign.

As shown in FIG. 4, switching circuit SW comprises a flip-flop $FF_2$ which is alternately set and reset by the command $s$ and which works into a logic network including eight AND gates $A_3$, $A_3'$, $A_3''$, $A_4$, $A_4'$, $A_4''$, $A_5'$, $A_5''$ and four OR gates $O_1$–$O_4$. AND gates $A_3$ and $A_4$ are unblocked in the reset state of flip-flop $FF_2$ whereas the other six AND gates are unblocked in its set state. Pulses $w'$ are fed directly to gate $A_4'$, through a first delay line $D_1'$ to gate $A_3'$ and through a second delay line $D_2'$ in cascade with line $D_1'$ to gate $A_5'$. Analogously, pulses $w''$ are fed directly to gate $A_4''$, through a first delay line $D_1''$ to gate $A_3''$ and through a second delay line $D_2''$ in cascade with line $D_1''$ to gate $A_5''$. AND gates $A_3'$ and $A_4$ work into OR gate $O_1$ to provide a writing pulse $w_1$ shortly after the occurrence of a primary pulse $w'$ or $w''$, dependint on the set or reset state of flip-flop $FF_2$. AND gates $A_3$ and $A_3''$ work into OR gate $O_2$ to produce a writing pulse $w_2$ shortly after the occurrence of a primary pulse $w''$ or $w'$, again depending on the state of flip-flop $FF_2$. OR gate $O_3$ is connected to the outputs of AND gates $A_4'$ and $A_4''$ to produce a guard pulse $m-$ upon the occurrence of a pulse $w'$ or $w''$; similarly, OR gate $O_4$ is connected to the outputs of AND gates $A_5'$ and $A_5''$ to produce a guard pulse $m+$ somewhat after the occurrence of either of these primary pulses.

In FIG. 2 we have shown a series of writing pulses $w_1$ individually numbered $w_{10}$–$w_{18}$ and writing pulses $w_2$ numbered $w_{20}$–$w_{28}$. Similarly, a series of reading pulses $r_1$ have been individually designated $r_{10}$–$r_{18}$ while a series of reading pulses $r_2$ have been labeled $r_{20}$–$r_{27}$. Writing pulses $w_{10}$ and $w_{20}$ are shown to be separated by about eight clock cycles from the corresponding reading pulses $r_{10}$ and $r_{20}$. This separation progressively diminishes but, upon the occurrence of the first test pulse $\Phi_{oi}$, is still wide enough to prevent a coincidence between a reading pulse $r_1$ and one of the guard pulses $m+$ and $m-$. Such a coincidence, between pulses $r_1$ and $m-$, occurs at reading pulse $r_{14}$ and results in the setting of flip-flop $FF_1$ (FIG. 3) which, in the form of signal $f$, stores that information until the pulse $\Phi_{oi}$ recurs, i.e. until shortly after the appearance of writing pulse $w_{26}$. The switchover command $s$ now issuing from OR gate O (FIG. 1) reverses the flip-flop $FF_2$ of switching circuit SW whereby the next writing pulse $w_2$, indicated at $w_{26}*$, immediately follows the primary pulse $w'$ instead of the pulse $w''$ as is true of the preceding writing pulses of this train. Thus, buffer register $M_2$ is loaded twice in succession by words from converter SP but is read only once at that time, i.e., by a pulse $r_{26}$. The next writing pulse $w_{17}$, applied to register $M_1$, is again spaced by about eight clock cycles from the associated reading pulse $r_{17}$ so that the further translation of incoming bit stream $b_i$ into outgoing bit stream $b_o$ proceeds in an orderly manner.

If the cadence of clock pulses CK" were higher than that of clock pulses CK', instead of lower as assumed above and shown in FIG. 2, a switchover would take place upon a coincidence of a reading pulse $r_1$ with a trailing guard pulse $m+$ rather than a leading guard pulse $m-$. The operation would be similar to that described, except that a writing pulse would be followed by two reading pulses whereby the contents of one of the buffer registers would be read out twice in succession, resulting in the duplication instead of the suppression of a word in one of the participating PCM channels.

In practice, the phase shift between the writing and reading pulses will be much more gradual than has been indicated in FIG. 2 so that, upon the generation of a near-coincidence signal $f$ as soon as a reading pulse $r_1$ begins to overlap a guard pulse, a test pulse $\Phi_{oi}$ will invariably appear before any beginning coincidence between another such reading pulse and an associated writing pulse $w_1$.

It will be apparent that the basic principles of our invention could also be realized if circuit SW, in response to a switchover command $s$ from unit CC, transposed the reading-pulse trains $r_1$, $r_2$ rather than the writing-pulse trains $w_1$, $w_2$. Also, the guard pulses $m+$, $m-$ could be timed to flank a train of reading pulses, e.g., $r_1$, with the corresponding writing pulses $w_1$ fed to monitoring unit CC in lieu of these reading pulses.

We claim:

1. An expandable memory for converting an incoming bit stream of a first bit frequency, divided into a succession of n-bit words where $n$ is an integer greater than 2, into an outgoing bit stream of a second bit frequency, comprising:
   first timing means controlled by the incoming bit stream for generating on a first pair of outputs a pair of interleaved pulse trains of a cadence $\frac{1}{2}n$ times said first bit frequency;
   second timing means independent of said incoming bit stream for generating on a second pair of outputs a second pair of interleaved pulse trains of a cadence $\frac{1}{2}n$ times said second bit frequency, the pulses of each train of said second pair being normally spaced from the pulses of corresponding trains of said first pair;
   bit-storing means including a pair of n-stage buffer registers, with writing inputs respectively connected to said first pair of outputs and with reading inputs respectively connected to said second pair of outputs;
   first circuit means for alternately writing the words of said incoming bit stream into said buffer registers under the control of said first pair of pulse trains;
   second circuit means for alternately reading the words written in said buffer registers under the control of said second pair of pulse trains;
   monitoring means connected to said first and second circuit means for detecting a near-coincidence of a pulse from one of said second pair of pulse trains with a pulse from the corresponding one of said first pair of pulse trains; and
   switchover means controlled by said monitoring means for transposing the pulse trains on one of said pairs of outputs, thereby re-establishing a normal spacing between the pulses of corresponding trains of said first and second pairs of pulse trains.

2. An expandable memory as defined in claim 1 wherein said first circuit means comprises a series/parallel converter and said second circuit means comprises a parallel/series converter.

3. An expandable memory as defined in claim 2 wherein said bit-storing means further comprises a multiplexer provided with said reading inputs and inserted between said buffer registers and said parallel/series converter.

4. An expandable memory as defined in claim 1 wherein one of said timing means has outputs producing a first and a second guard pulse immediately before and immediately after each pulse of one of the trains of the respective pair of pulse trains, said monitoring means comprising a logic network connected to said outputs for generating a transposition command for said switchover means in response to a coincidence of either of said guard pulses with a pulse of the corresponding train of the other pair of pulse trains.

5. An expandable memory as defined in claim 4 wherein said one of said timing means is said first timing means, said switchover means being inserted between said first timing means and said writing inputs.

6. An expandable memory as defined in claim 4 wherein said logic network includes storage means for temporarily preserving said transposition command, and a source of periodic test pulses connected to said storage means for forwarding a stored transposition command to said switchover means.

7. An expandable memory as defined in claim 6 wherein said source is coupled with said second timing means for producing said test pulses at a submultiple of the cadence of said second pair of pulse trains.

* * * * *